United States Patent [19]

Clearwaters et al.

[11] 4,207,621

[45] Jun. 10, 1980

[54] ELECTRICALLY STEERABLE SONAR SYSTEM

[75] Inventors: Walter L. Clearwaters, Waterford; Lloyd T. Einstein, New London, both of Conn.

[73] Assignee: The United States of America as represented by the Secretary of the Navy, Washington, D.C.

[21] Appl. No.: 320,580

[22] Filed: Oct. 31, 1963

[51] Int. Cl.[2] .......... G01S 3/80

[52] U.S. Cl. .......... 367/122; 367/123; 367/138; 367/153; 367/173

[58] Field of Search .......... 340/6, 16, 3, 5; 343/100.6; 367/103, 105, 122, 123, 138, 153, 173

[56] References Cited

U.S. PATENT DOCUMENTS

| | | | |
|---|---|---|---|
| 1,995,708 | 3/1935 | Fischer | 340/6 |
| 2,786,193 | 3/1957 | Rich | 340/6 |
| 2,915,588 | 12/1959 | Bose | 179/1 |
| 2,925,581 | 2/1960 | Hackley | 340/6 |
| 3,039,079 | 6/1962 | Walters et al. | 340/6 |
| 3,074,048 | 1/1963 | Turner | 340/6 X |
| 3,163,844 | 12/1964 | Martin | 340/6 |

*Primary Examiner*—Richard A. Farley

*Attorney, Agent, or Firm*—Richard S. Sciascia; Arthur A. McGill; Prithvi C. Lall

EXEMPLARY CLAIM

1. An underwater acoustic listening equipment for use in selectively establishing one of a number of narrow angle listening beams having good signal to noise ratio comprising:

a spherical framework, several hundred identical hydrophones fixedly secured to the framework in approximately uniformly distributed relationship and identically oriented with respect to and equidistant from the center of the framework, acoustic and vibration shielding between said hydrophones and said framework to substantially block acoustic energy from reaching each hydrophone from a reverse direction, means for summing signals from a plurality of the hydrophones, a delay line for each hydrophone, beam selecting switch means for coupling the signals from a group of the hydrophones supported on a substantial area of the spherical framework symmetrical about the line of direction of the desired beam and delayed by the respective delay lines in accordance with the spacing in the direction of the beam of the hydrophones selected by the switch means and the speed of waterborne acoustic energy where the equipment is used.

3 Claims, 10 Drawing Figures

ELECTRICALLY STEERABLE SONAR SYSTEM

The invention described herein may be manufactured and used by or for the Government of the United States of America for governmental purposes without the payment of any royalties thereon or therefor.

This invention relates to electrically steerable hydrophone or transducer arrays.

An object of this invention is to selectively direct a listening and/or a transmitting beam in a number of directions in azimuth and in elevation in an efficient, reliable, expeditious, and generally advantageous manner.

A further object is to provide an electrically steerable hydrophone and/or transducer array for directing a narrow angle listening or transmitting beam in one of many directions in azimuth and in elevation and wherein the listening beam sensitivity or the transmitting beam intensity in all beam directions is approximately the same.

A further object is to provide a hydrophone and/or transducer array for narrow frequency band application or for broad frequency band application having a highly directive listening or transmitting beam and operable to step the beam 360 degrees in azimuth and operable to step the beam vertically over a large part of 180 degrees in elevation, and wherein the beam sensitivity in all directions is approximately the same.

Other objects and advantages will appear from the following description of an example of the invention, and the novel features will be particularly pointed out in the appended claims.

Figure 1:
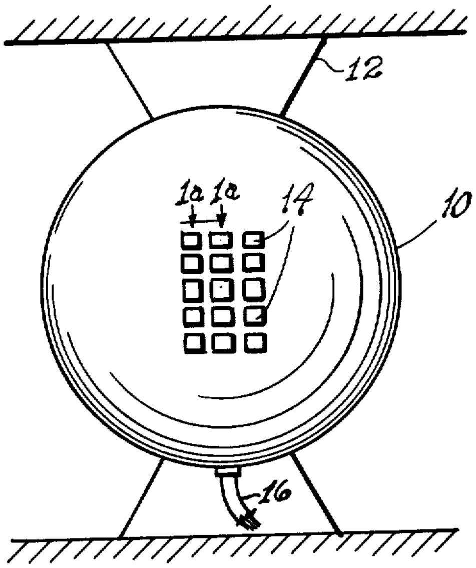
Figure 1A:
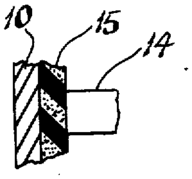
Figure 2:
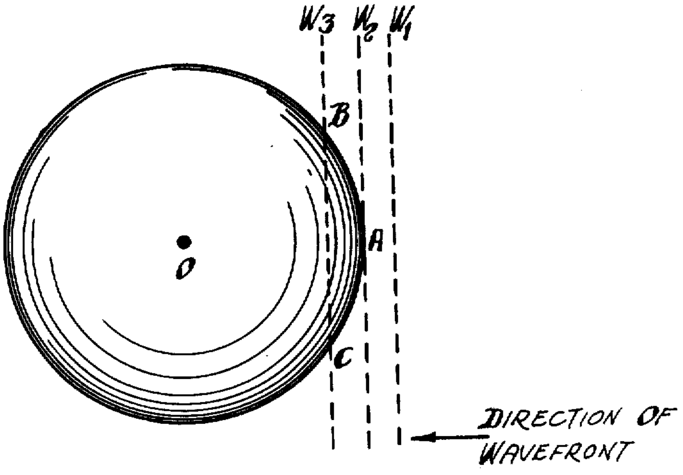
Figure 3:
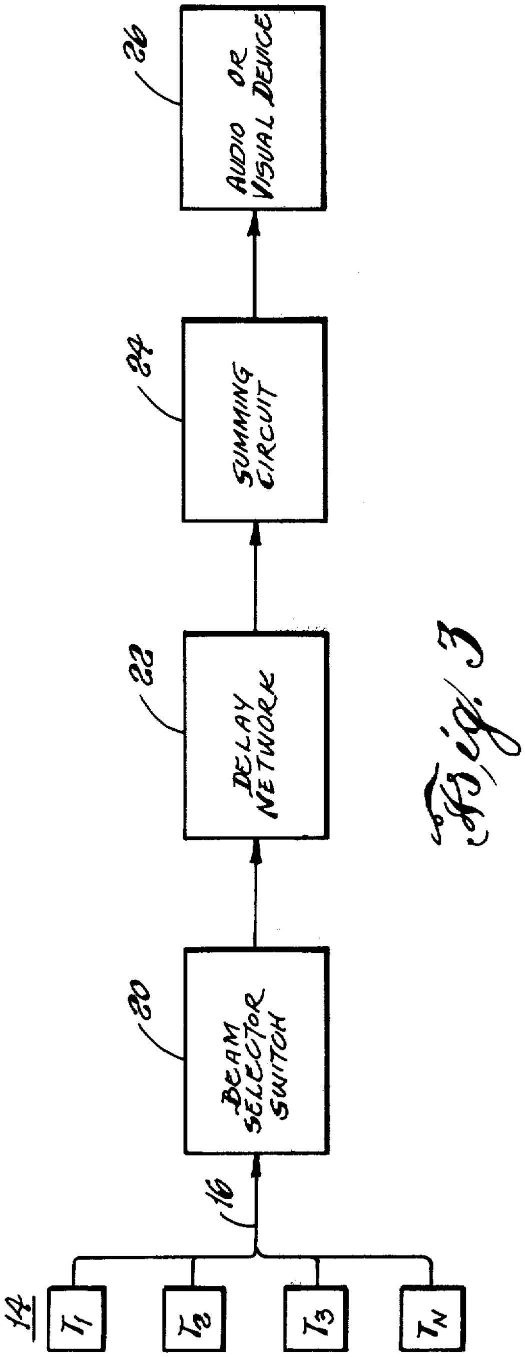
Figure 4:
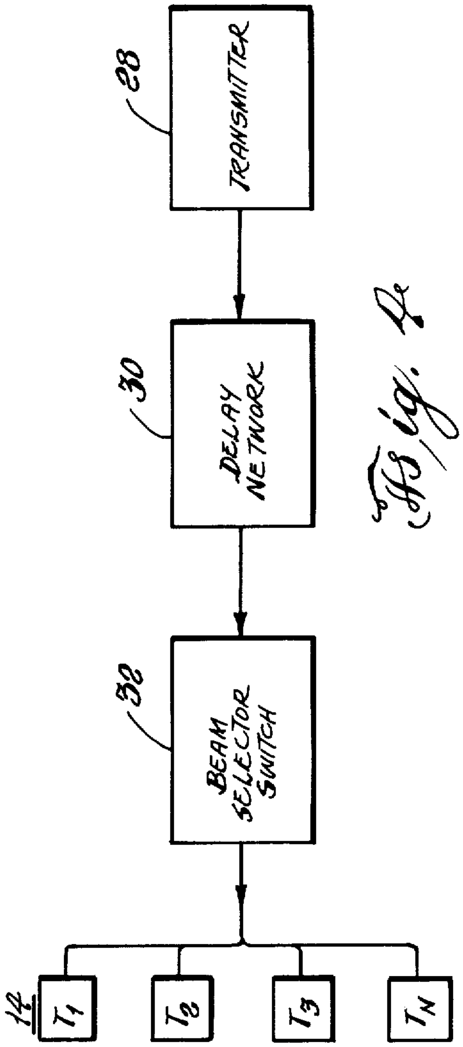
Figure 5:
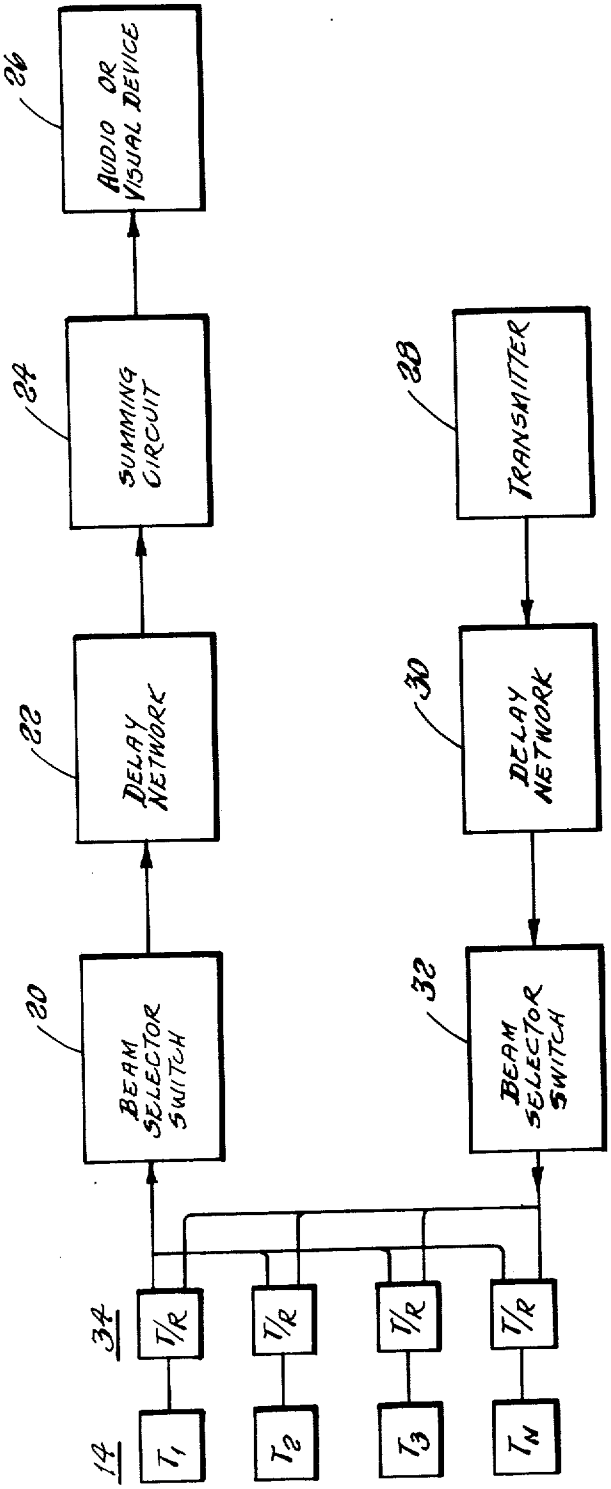
Figure 6:
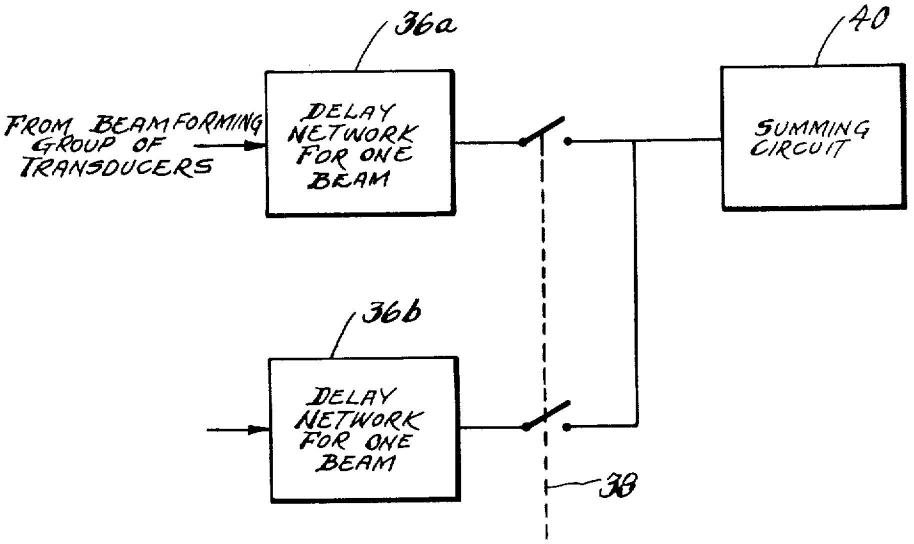
Figure 7:
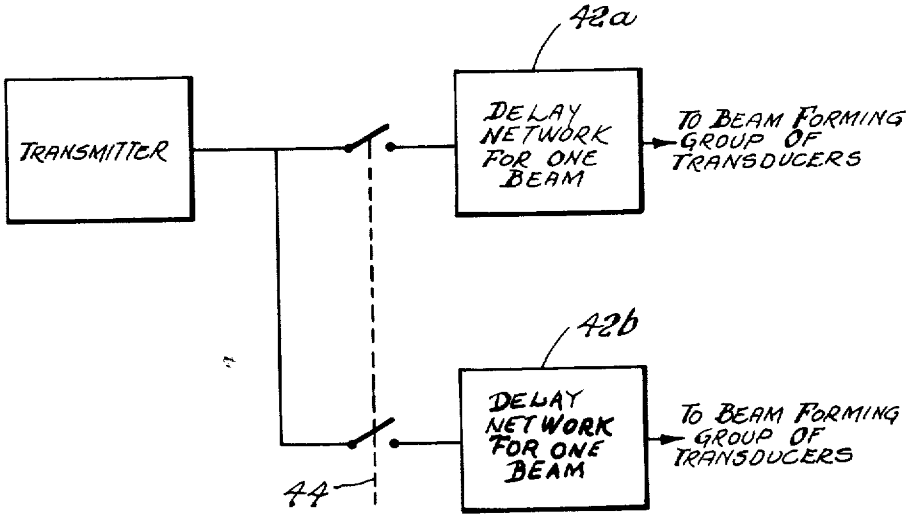
Figure 8:
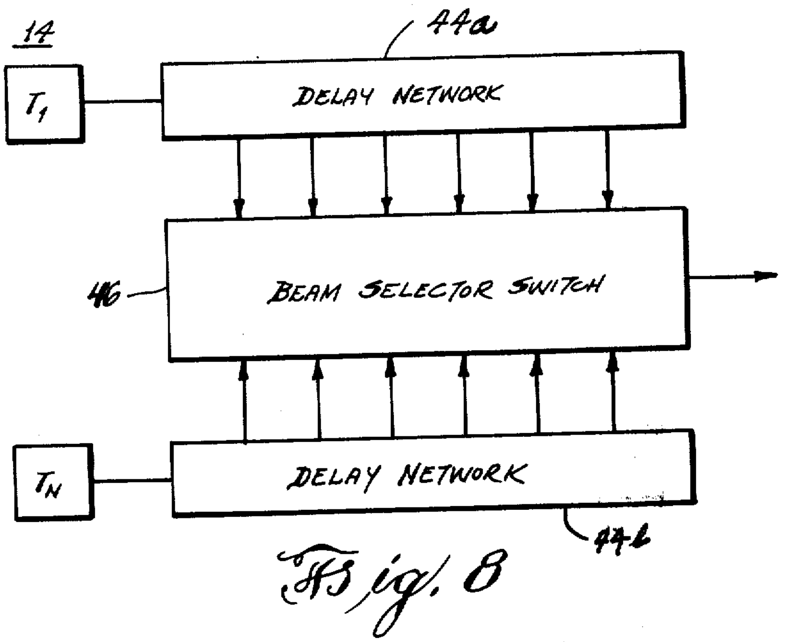

FIG. 1 illustrates in outline a hydrophone or transducer array in accordance with this invention, FIG. 1*a* is a section taken on line 1*a*—1*a* of FIG. 1, on an enlarged scale, to show vibration and acoustic shielding between each hydrophone or transducer and the array framework, FIG. 2 shows an acoustic wavefront progressing through a sphere, FIGS. 3, 6 and 8 are block diagrams of embodiments of listening beam forming networks for the array of FIG. 1, FIGS. 4, 7 and 9 are block diagrams of embodiments of a transmitting beam forming networks for the array of FIG. 1, and FIG. 5 is a block diagram of combined listening and transmitting beam forming network.

In the embodiment illustrated in FIG. 1, there is shown a rigid, hollow, free-flooding spherical framework 10 fixed to a mounting 12 on a vessel or a stationary structure in the sea. The details of the spherical framework are not significant to the invention. The framework may be formed of cast sections, shaped plates, bars or pipes assembled together as a rigid cage, and may be of metals or synthetics assembled by welding, screw fastening, or other conventional method. In the illustrated embodiment, the spherical framework is engaged at top and bottom by the mounting structure, thereby leaving the framework free in azimuth and for the major part of 180 degrees in elevation. In general, the mounting arrangement is designed to leave free at least that part of the sphere demanded by operational requirements, for example, the sphere may be secured to a lateral mounting where full 180 degree range in elevation between predetermined azimuthal limits is required.

A large number of substantially identical acoustic elements 14, which may be either hydrophones or transducers, are secured to the spherical framework equidistant from and identically oriented with respect to the center of the frame-work. While not essential, it is preferable that the individual acoustic elements be responsive over a wide solid angle, up to 180 degrees, and that they be symmetrically responsive about a radial line through the element center and the center of the sphere. Conventional acoustic and vibration shielding 15 between the acoustic elements and the framework, substantially blocks energy from reaching the acoustic elements in a reverse direction. The shielding material may be any described in the underwater acoustic art, e.g., cellular rubber. Therefore, these elements sense mainly waterborne acoustic energy in the vicinity of the array and little or none of the energy that passed through the array. Individual connecting leads from all the acoustic elements are assembled into a cable 16 for connection to the beamforming means described below. The hydrophones or transducers selected as acoustic elements for the array may be any of the vast variety of compact units, electrostrictive, magnetostrictive, variable reluctance, or hydrodynamic, now available in the art. Operation requirements such as frequency, sensitivity, ruggedness, size, weight, cost, none of which are material to the invention, dominate the choice. The relationship of sphere diameter to acoustic element size is such that upward of several hundred elements can be mounted on the framework 10.

Adjacent acoustic elements are spaced apart on centers a distance determined by the requirements of proper beam formation and maximum increase in signal to noise ratio, which may include the interaction effects between elements and the spatial correlation of the surrounding noise field. If these requirements are not completely met, degradation from optimum performance will result. However, the general utility of the spatial arrangement of elements will still obtain even if performance is below the optimum.

The embodiments of the invention may be less than a whole sphere; they may take the form of a truncated sphere, a hemisphere, or spherical sector.

In this invention, a narrow listening beam in a particular direction is obtained by summing the signals from those acoustic elements mounted on a large sector of the sphere symmetrical about the beam direction. The sector is circular, square, or rectangular according to the beam shape desired. For broadband signals, delay lines connected to the acoustic elements compensate for differences in time of arrival of acoustic energy from the beam direction at the acoustic elements of the beam forming group, bringing the signals of all the acoustic elements into synchronism. For single frequency or narrow band signals, phasing circuits connected to the acoustic elements bring the signals of all the acoustic elements into step.

In FIG. 2, there is shown an acoustic wavefront progressing through a sphere in its path. The wavefront is planar because the distance between the source of the acoustic signal energy and the sphere is very great compared to the diameter of the sphere. In sonar applications, this is essentially always true. As the wavefront progresses from W1 to W2, it crosses an acoustic element at A which element senses the acoustic signal energy. When the wavefront progresses through the sphere to W3, acoustic elements on circle B-C sense the same acoustic signal sensed just previously at A. To form a listening beam centered about radius OA, the signal energies from acoustic elements on a selected sector of the sphere symmetrical about radius OA are summed, after having been variously delayed or phased to compensate for differences in time of arrival of the signal wavefront from direction OA at those acoustic elements.

The width of each beam horizontally or vertically, the number of beams and the angular spacing between beam directions are related to the total number of acoustic elements, the element spacings, the number of elements in each beam forming group, the horizontal and vertical dimensions of the spherical sector defined by the beam forming groups, and the geometry of the spacing of the elements. In one geometric arrangement, the elements may be distributed on the framework as a series of vertically spaced horizontal rings. For evently spaced beams in azimuth or in elevation, and of approximately equal sensitivity, identical elements are spaced approximately equal distances apart, and each beam forming group of elements has the same number of elements in the same configuration.

One listening beam forming arrangement is shown in FIG. 3. All of the acoustic elements $T_1$, $T_2$, $T_3$, $T_N$, on the sphere are connected to separate contacts of a beam selector switch 20. From FIG. 2 it may be seen that as the wavefront progresses through the sphere it is sensed by several acoustic elements equally spaced from the line of direction of the beam. The switch is operable to select one of a number of predetermined beam forming groups of the acoustic elements for a selected beam direction and connects in common elements of the beam forming group that sense essentially simultaneously a signal wavefront from the beam direction. The number of distinct time delays required for a beam forming group may be significantly smaller than the number of acoustic elements in the beam forming group. If the number and arrangement of acoustic elements in the beam forming groups are not the same, the number of distinct time delays is somewhat greater than is needed for an array where the number and arrangement of the elements in all the beam forming groups are the same. A delay network 22 is connected to switch 20 for properly delaying the signal energies from the acoustic elements of a selected beam forming group to bring them into synchronism. The time delay network may include an independent circuit for each delay required for the beam forming or may be one network with a plurality of input terminals. The beam selector switch interconnects acoustic elements of the beam forming group with portions of the delay network for proper time delay. A summing circuit 24 is connected to the delay network to add the variously delayed signal energies. The output of the summing circuit is coupled to an audio or visual device 26 such as a recorder, speaker, CRT display, etc.

A transmitting beam forming arrangement analogous to the listening beam forming arrangement of FIG. 3 is shown in FIG. 4. The output of a transmitter 28 is coupled to a delay network 30 or phasing circuit where the signal power is divided and the parts are time displaced. A beam selector switch 32 connected between the delay network 30 and the transducers 14 selects a beam forming group of transducers and provides each transducer of the selected beam forming group with properly delayed or phased signal power for an efficient output beam in the selected direction.

In FIG. 5, there is shown, in combination, a listening beam forming network and a transmitting beam forming network as in FIGS. 3 and 4 connected to the same set of transducers 14 and including a transmit-receive switch 34 in each signal line. With this arrangement it is possible to achieve combinations of receiving and transmitting beams utilizing a single set of transducer elements for transmitting and receiving functions.

Another listening beam forming arrangement, shown in FIG. 6, includes a separate delay network 36 for each listening beam. Each acoustic element is coupled to the time delay networks corresponding to those beams in which the acoustic element participates. A beam selector switch 38 couples the signals from a selected one of the delay networks to the summing circuit 40. As in the embodiment illustrated in FIG. 3, each delay network 36 may include independent delay circuits for each of the delays required for the beam, or one network with several input terminals for the respective delays.

A transmitting beam forming arrangement analogous to the listening beam forming arrangement shown in FIG. 6 is shown in FIG. 7. A separate delay network 42 is provided for each transmitting beam connected to respective beam forming groups of transducers in the array. A beam selector switch 44 is operable to connect the signal power from the transmitter to one of the delay networks 42. Each transducer of the array is coupled to each of the delay networks corresponding to those transmitting beams in which the transducer participates. As in the previous embodiments, each delay network may include independent delay circuits for each of the delays required for the beam, or one network with several output terminals for the respective delays.

The embodiment of FIG. 6 and FIG. 7 can be combined as shown in FIG. 5.

Another listening beam forming arrangement shown in FIG. 8 includes one delay network 44 having several output terminals with different delay factors for each acoustic element 14. Each acoustic element is in a number of beam forming groups. Each delay may be correct for more than one beam in which the acoustic element participates. Therefore, there may be fewer delay selections for each acoustic element than the number of beams in which the acoustic element participates. A beam selector switch 46 combines the signal energies from the acoustic elements included in the selected beam forming group, properly delayed by networks 44 for maximum signal output. For each beam, the acoustic elements equidistant from the radial line corresponding to the beam direction may be connected in common.

Figure 9:
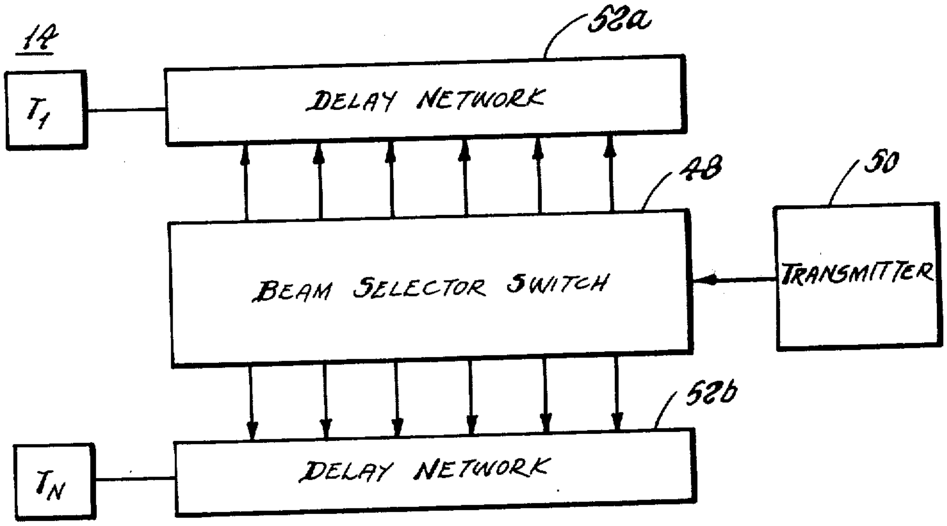

A transmitting beam forming arrangement analogous to the listening beam forming arrangement shown in FIG. 8 is shown in FIG. 9, including a beam selector switch 48 connected between transmitter 50 and delay networks 52. The embodiments shown in FIGS. 8 and 9 can be combined as shown in FIG. 5.

In each of the transmitting beam arrangements described, the amplification of signal energy to its maximum desired level may be achieved either at the transmitter output or in individual amplifiers preceding each transducer.

It will be understood that various changes in the details, materials and arrangements of parts (and steps), which have been herein described and illustrated in order to explain the nature of the invention, may be made by those skilled in the art within the principle and scope of the invention as expressed in the appended claims.

We claim:

1. An underwater acoustic listening equipment for use in selectively establishing one of a number of narrow angle listening beams having good signal to noise ratio comprising:

a spherical framework, several hundred identical hydrophones fixedly secured to the framework in approximately uniformly distributed relationship and identically oriented with respect to and equidistant from the center of the framework, acoustic and vibration shielding between said hydrophones and said framework to substantially block acoustic energy from reaching each hydrophone from a reverse direction, means for summing signals from a plurality of the hydrophones, a delay line for each hydrophone, beam selecting switch means for coupling the signals from a group of the hydrophones supported on a substantial area of the spherical framework symmetrical about the line of direction of the desired beam and delayed by the respective delay lines in accordance with the spacing in the direction of the beam of the hydrophones selected by the switch means and the speed of waterborne acoustic energy where the equipment is used.

2. An underwater acoustic equipment for passive listening in one of a number of beam directions in azimuth and in elevation with respect to a common reference point and with approximately equal sensitivity in all said directions comprising:

several hundred substantially identical hydrophones, means fixedly securing said hydrophones in approximately uniformly distributed relationship equidistant from a common point and identically oriented with respect to the common point, the geometric relationship of all said hydrophones defining at least the major part of a sphere, acoustic and vibration shielding between said hydrophones and said means to substantially block acoustic energy from reaching each hydrophone from a reverse direction, signal summing means, selectively operable switching means for coupling signals from the hydrophones in any selected beam forming group of said hydrophones to said signal summing means, the number of hydrophones in all said beam forming groups of hydrophones and the areas occupied thereby, being approximately equal, and time delay means selectively connected by said switching means between the hydrophones of said beam forming group of said hydrophones and the signal summing means to compensate for differences in time of arrival of waterborne acoustic energy from the respective beam direction to the individual hydrophones of the beam forming group.

3. An underwater acoustic equipment for passive listening in one of a number of beam directions in azimuth and in elevation with respect to a common reference point and with approximately equal sensitivity in all the beam directions comprising:

a plurality of substantially identical hydrophones, means fixediy securing said hydrophones in distributed relationship equidistant from a common point and identically oriented with respect to the common point, the geometric relationship of all said hydrophones defining at least the major part of a sphere, the spacings between adjacent hydrophones being approximately equal, acoustic and vibration shielding between said hydrophones and said means to substantially block acoustic energy from reaching each hydrophone from a reverse direction, signal summing means, time delay means for the hydrophones in each beam forming group of hydrophones to compensate for time of arrival of waterborne acoustic energy from the respective beam direction to the individual hydrophones of the group, the number of hydrophones in all said beam forming groups of hydrophones being approximately equal, and switch means for coupling the time delayed signals from a selected beam forming group of hydrophones to the signal summing means.

* * * * *